United States Patent Office 3,161,674
Patented Dec. 15, 1964

3,161,674
PREPARATION OF CARBOXYLIC ACIDS BY THE HYDROGENATION OF GAMMA-LACTONES
Edward U. Elam and James C. Martin, Kingsport, Tenn., assignors to Eastman Kodak Company, Rochester, N.Y., a corporation of New Jersey
No Drawing. Filed Mar. 22, 1961, Ser. No. 97,420
4 Claims. (Cl. 260—540)

This invention relates to the preparation of branched chain carboxylic acids, and more particularly to the production of such acids by hydrogenation of saturated gamma,gamma-dialkyl-gamma-lactones.

Hydrogenation of certain lactones has been reported in the literature. Thus, Jacobs and Scott [J. Biol. Chem., 87,601–613 (1930)] reported the hydrogenation of unsaturated gamma-lactones, having the double bond at the gamma carbon atom, to the saturated desoxy acid. Caldwell (U.S. Patent 2,484,486) reported the catalytic hydrogenation of beta-lactones, in which the alpha carbon atom is substituted only with hydrogen atoms, to the carboxylic acid. Adkins (Reactions of Hydrogen, p. 78, University of Wisconsin Press, 1937) reported the hydrogenation of gamma-lactones in which the gamma-carbon atom is substituted only with hydrogen atoms, to the glycol. However, to the best of our knowledge, no previous reports have been made of the hydrogenation of saturated gamma,gamma-dialkyl substituted gamma-lactones. The present invention is based on our discovery that the latter type of lactones can be hydrogenated in good yield to branched chain carboxylic acids.

One object of this invention is to provide a method for the prepartion of saturated, branched chain carboxylic acids. Another object is to provide a method for the hydrogenation of saturated gamma,gamma-dialkyl-gamma lactones. A further object is to provide a method for the hydrogenation of saturated gamma,gamma-dialkyl-gamma-lactones to branched chain carboxylic acids in good yield. Other objects of this invention will be apparent to those skilled in the art from the following disclosure.

These and other objects are accomplished by the hydrogenation of gamma,gamma-dialkyl-lactones with a hydrogenation catalyst and water. The gamma-lactones used as the starting material in our process are shown in the following structural formula:

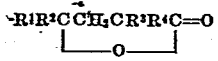

wherein $R^1$ and $R^2$ are alkyl groups having 1 to 4 carbon atoms, and $R^3$ and $R^4$ are hydrogen atoms or alkyl groups containing 1 to 4 carbon atoms.

The gamma,gamma-dialkyl-gamma-lactones which are the starting materials for the process of our invention may be prepared from the corresponding beta-lactones according to the method described by Hasek and Elam, U.S. patent application filed August 26, 1959, Serial No. 836,078, now Patent No. 3,004,989. The beta-lactones may be prepared by condensing ketene with an aldehyde by the methods described in U.S. Patent 2,356,459 of August 22, 1944.

The following examples will further illustrate our invention. Examples 1 and 2 demonstrate the hydrogenation of gamma-isocaprolactone to 4-methylvaleric acid.

Example 1

A mixture of 73 g. (0.64 mole) of gamma-isocaprolactone and a solution of 26 g. (0.65 mole) of sodium hydroxide in 150 ml. of water was hydrogenated over 10 g. of Raney Nickel at 300° C. and 3000 p.s.i. pressure for six hours. The reaction product was decanted from the catalyst, acidified with hydrochloric acid, extracted with ether, and the ether extracts were evaporated on a steam bath. The residue was distilled at atmospheric pressure to give 40 g. of a fraction boiling from 193–195° C., $n_D^{20}$ 1.4180. Analysis of this fraction by direct titration to obtain free acid and by saponification to give total acid and unreacted lactone indicated that the product contained 83 percent 4-methylvaleric acid and 17 percent unreacted gamma-isocaprolactone. The acid was separated from unreacted lactone by extracting the reaction product with sodium bicarbonate solution, washing the extract with ether, and then evaporating the aqueous solution to dryness on the steam bath. The acid chloride was prepared from the resulting sodium salt by reaction with thionyl chloride. The resulting crude acid chloride was then reacted with aniline to give the anilide of 4-methylvaleric acid which melted at 110° C. after two recrystallizations from dilute ethyl alcohol. The compound was analyzed as follows. Calculated for $C_{12}H_{17}NO$: C, 75.4; H, 8.80; N, 7.34. Found: C, 75.0; H, 8.95; N, 7.31.

Example 2

An autoclave was charged with 57 g. of gamma-isocaprolactone 100 ml. of water, and 10 g. of 5 percent palladium on alumina and the contents were hydrogenated for six hours at 300° C. and 3000 p.s.i. pressure. The organic layer of the resulting reaction mixture was then analyzed by vapor phase chromatography and was found to contain 2.6 percent of unreacted gamma-isocaprolactone and 85.3 percent of 4-methylvaleric acid. Titration with base indicated that the reaction product was 87.7 percent total acid calculated as 4-methylvaleric acid.

The importance of providing a substantial concentration of water for the reaction is demonstrated by the following example. The water concentration is substantially lower than in the preceding example and as a consequence the yield of the desired acid is considerably lower.

Example 3

A solution of 3 ml. of water in 57 g. of gamma-isocaprolactone was hydrogenated for six hours at 300° C. and 3000 p.s.i. pressure using 10 g. of 5 percent palladium on alumina as catalyst. The resulting reaction product was filtered and analyzed by vapor phase chromatography, and was found to contain 50.9 percent 4-methylvaleric acid. Titration with alkali indicated an acid content equivalent of 50.4 percent 4-methylvaleric acid.

The alpha,alpha,gamma,gamma-tetraalkylbutyric acids which may also be prepared by the process of our invention have recently become of interest in connection with the preparation of heat and hydrolysis-resistant esters which are used for synthetic lubricants and plasticizers. The following example demonstrates the preparation of such acids in accordance with the invention.

Example 4

A mixture of 80 g. (0.56 mole) of 2,2,4-trimethyl-4-hydroxyvaleric acid gamma-lactone and a solution of 24 g. (0.6 mole) of sodium hydroxide in 300 ml. of water was hydrogenated at 300° C. and 3000 p.s.i. pressure over 10 g. of Raney nickel for two hours. The product was filtered, acidified, and extracted with ether. Distillation of the extract gave 44.1 g. (55% yield) of 2,2,4-trimethylvaleric acid which boiled at 116–17° C. (15 mm.). The compound was analyzed as follows. Calculated for $C_8H_{16}O_2$: C, 66.7; H, 11.1; neutral equivalent, 144. Found: C, 67.0; H, 11.2; neutral equivalent, 147.

We have carried out a series of reactions in accordance with the invention at different temperatures. The reactions were carried out as in Example 1, with the exception that different temperatures were employed. The results, as shown in Table I, demonstrate the importance of operating at a temperature of at least 200° C. and show that markedly superior yields of the desired acid and low yields of impurities are obtained in the range of about 250 to 350° C.

Table I

| Temperature | Percent Acid | Percent Lactone | Percent Impurities |
|---|---|---|---|
| 200° C | 2.1 | 78.2 | 19.7 |
| 250° C | 9.4 | 72.6 | 18.0 |
| 300° C | 87.0 | 2.6 | 10.4 |

A number of hydrogenation catalysts may be employed in carrying out our invention but the Group VIII metal catalysts are especially satisfactory. When a base metal catalyst, such as nickel, cobalt or iron is employed, the life and activity of the catalyst may be increased by carrying out the reaction with added alkali. The noble metal catalysts such as platinum, palladium, rhodium and ruthenium may be employed without the addition of alkali since their life is not adversely affected by the acid formed during the reaction. The presence of water as an essential element of the reaction mixture precludes the use of catalysts of the copper chromite type.

The reaction conditions for the process can be varied over relatively wide ranges. However, for satisfactory yields of the desired acids the temperature should be in the range of about 200 to 400° C., the particular temperature to be employed being influenced by the other reaction variables. We prefer to conduct the hydrogenation at a temperature of about 250 to 350° C. since this is the range within which the highest yields of the desired acids are obtained. Pressures of 1500–3000 pounds per square inch of hydrogen are preferred although the reaction may be conducted using pressures of a much wider range, such as 500–5000 pounds per square inch. Water is essential in our process. As shown in Example 3, very small amounts of water result in decreased yield. Preferably, the amount of water is at least one mole per mole of lactone but generally satisfactory results can be obtained with concentration of water in the range of about 0.1 to 10 moles of water per mole of lactone.

The gamma,gamma-dialkylbutyric acids prepared by the process of this invention have many uses as chemical intermediates in the preparation of plasticizers, insecticides, insect repellants, synthetic lubricants and the like. For example, 4-methylvaleric acid forms esters with several alcohols to produce useful compounds. The ester of this acid with 2,4,5-trichlorophenol is an effective fungicide, its ester with 1,2,6-hexanetriol is a useful plasticizer for vinyl resins, and its ester with 1,2,3,4-tetrahydro-2-naphthol is useful as a mosquito repellant. The phenylhydrazide of 4-methylvaleric acid is an extremely effective insecticide.

The alpha,alpha,gamma,gamma-tetraalkylbutyric acids which may also be prepared by the process of our invention have utility in the preparation of heat and hydrolysis-resistant esters which are useful for synthetic lubricants and plasticizers.

Although the invention has been described in considerable detail with reference to certain preferred embodiments thereof, it will be understood that variations and modifications can be effected within the spirit and scope of the invention as described hereinabove and as defined in the appended claims.

We claim:

1. The process for preparing branched chain saturated carboxylic acids from gamma-lactones which comprises hydrogenating at a pressure of 500 to 5000 pounds per square inch, in the presence of a Group VIII metal catalyst and 0.1 mole to 10 moles of water per mole of lactone, and at a temperature within the range of 200° C. to 400° C., a lactone of the structure:

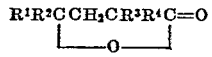

wherein $R^1$ and $R^2$ are alkyl groups having 1 to 4 carbon atoms, and $R^3$ and $R^4$ are independently selected from the group consisting of hydrogen and alkyl groups containing 1 to 4 carbon atoms.

2. The process for preparing branched chain saturated carboxylic acids from gamma-lactones which comprises hydrogenating at a pressure of about 3000 pounds per square inch, in the presence of a catalyst selected from the group consisting of platinum, palladium, rhodium and ruthenium and at least one mole of water per mole of lactone at a temperature within the range of 300° C. to 350° C., a lactone of the structure:

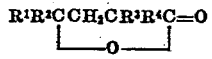

wherein $R^1$ and $R^2$ are alkyl groups having 1 to 4 carbon atoms, and $R^3$ and $R^4$ are independently selected from the group consisting of hydrogen and alkyl groups having 1 to 4 carbon atoms.

3. The process for preparing branched chain saturated carboxylic acids from gamma-lactones which comprises hydrogenating at a pressure of about 3000 pounds per square inch, in the presence of a catalyst selected from the group consisting of nickel, cobalt and iron together with at least one mole of a base and at least one mole of water per mole of lactone, at a temperature within the range of 300° C. to 350° C., a lactone of the structure:

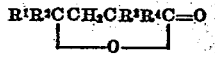

wherein $R^1$ and $R^2$ are alkyl groups having 1 to 4 carbon atoms, and $R^3$ and $R^4$ are independently selected from the group consisting of hydrogen and alkyl groups having 1 to 4 carbon atoms.

4. The process for preparing 2,2,4-trimethylvaleric acid which comprises hydrogenating 2,2,4-trimethyl-4-hydroxyvaleric acid-gamma-lactone at a pressure of about 3000 pounds per square inch, in the presence of a nickel catalyst, together with at least one mole of a base and at least one mole of water per mole of lactone, at a temperature within the range of 300° C. to 350° C.

References Cited in the file of this patent

UNITED STATES PATENTS 2,484,486    Caldwell _____ Oct. 11, 1949

UNITED STATES PATENT OFFICE
CERTIFICATE OF CORRECTION

Patent No. 3,161,674                              December 15, 1964

Edward U. Elam et al.

It is hereby certified that error appears in the above numbered patent requiring correction and that the said Letters Patent should read as corrected below.

Column 4, line 25, and line 40, second occurrence, and line 54, both occurrences, for "at least", each occurrence, read -- about --.

Signed and sealed this 27th day of July 1965.

(SEAL)
Attest:

ERNEST W. SWIDER                                      EDWARD J. BRENNER
Attesting Officer                                            Commissioner of Patents